Oct. 8, 1929.  H. J. WHITE  1,730,637
MACHINE FOR PRODUCING GEARS
Filed Feb. 14, 1928  2 Sheets-Sheet 1

INVENTOR
Herbert J. White
BY
ATTORNEY

Oct. 8, 1929.  H. J. WHITE  1,730,637
MACHINE FOR PRODUCING GEARS
Filed Feb. 14, 1928    2 Sheets-Sheet 2

INVENTOR
Herbert J. White
BY
P. H. Schlesinger
ATTORNEY

Patented Oct. 8, 1929

1,730,637

UNITED STATES PATENT OFFICE

HERBERT J. WHITE, OF ROCHESTER, NEW YORK, ASSIGNOR TO GLEASON WORKS, OF ROCHESTER, NEW YORK, A CORPORATION OF NEW YORK

MACHINE FOR PRODUCING GEARS

Application filed February 14, 1928. Serial No. 254,249.

The purpose of the present invention is to provide an improved construction for machine tools and particularly for machines for producing tapered gears which is especially applicable where the work to be operated upon has a long shank or shaft.

It is usual in gear cutting machinery to move the work away from the tool mechanism for removing the completed blank and chucking a new blank, by moving the blank or tool carrier outwardly in a direction generally perpendicular to the plane of operation of the tools. Where the work to be operated upon, however, is, for instance, a gear or pinion having an elongated integral shank or shaft, as is true in some types of differential gears, for instance, this is not practical for the blank carrier has to be moved an excessively long distance away from the tool mechanism to give the operator room enough to work to permit him to take the blank off the machine and to chuck a new blank without striking the tools. There is too much floor space required for the machine and floor space is costly. Besides this, the cost of a machine with the excessively long blank or tool carrier movement would be very high and its rate of production would be slowed up because of the excessively long distance required for the movement of the blank carrier to and from cutting position.

Instead of moving the blank carrier or slide directly away from the tool mechanism, it is proposed in the present invention to swing the blank slide or carrier angularly in such a way as to incline the axis of the blank away from the tool mechanism far enough to permit the blank to be pulled off at one side of the machine and chucked in the same way. This can be done without any increase in floor space and has been found to materially lessen the time required for chucking a blank or removing the completed gear blank from the machine.

With the present invention, also, means are provided which may be actuated to initially unlock the blank slide or carrier and thereafter swing it away from the tool mechanism when the blank has been completed, and which may be actuated, after a new blank has been chucked, to return the blank slide initially to cutting position and thereafter lock said slide in this position. With these features are combined, also, chuck releasing apparatus operative to release the chuck or clamp for the blank automatically during the time the blank slide or carrier is being swung away from the tool mechanism so that when the blank has been swung away the desired distance, the operator has simply to pull the blank out of the work spindle to remove it from the machine.

The principal objects of this invention have already been referred to. Other objects will be apparent hereinafter from the specification and from the recital of the appended claims.

Figure 1:
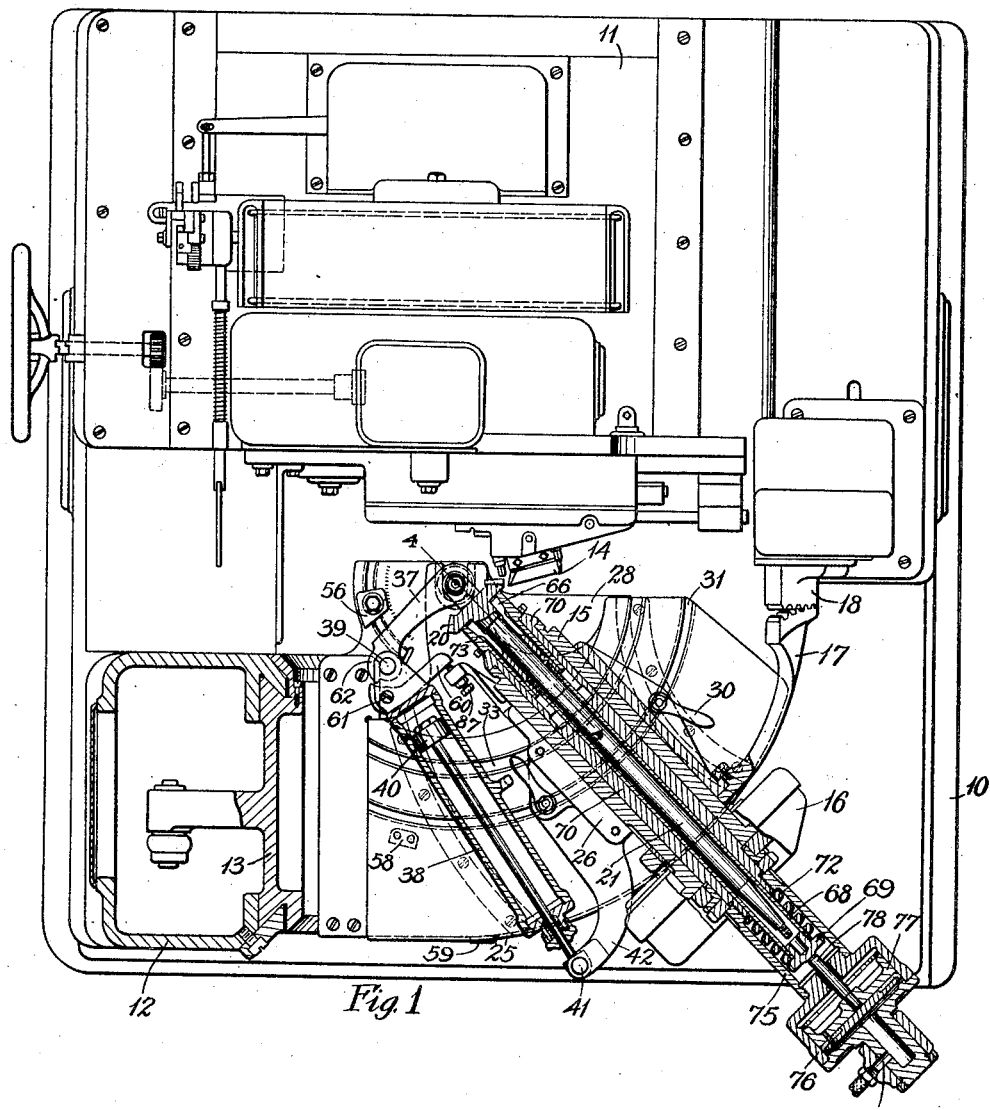
Figure 1 is a plan view of a bevel gear generating machine constructed according to this invention, showing in section the blank chucking and releasing mechanism and the mechanism for moving the work slide or carrier to and from cutting position and showing the positions of the parts when the blank is in operating engagement with the tools.

The present invention is illustrated as applied to a machine for generating long shanked bevel differential gears. In this machine, the usual adjustments are provided for bringing the tool mechanism and blank into cutting relation and the usual means are provided for actuating the tool mechanism, for producing the generating roll, and for intermittently indexing the blank. The blank head or support is mounted upon a slide which is angularly movable to swing the blank so as to incline its axis away from the tool mechanism far enough to permit taking the blank off the machine at one side and to permit chucking a new blank in the same way. The movement of the slide is effected hydraulically through a novel arrangement which is operative, when the blank is in cutting position, to first unlock or unclamp the blank slide from the base or plate to which it is secured and thereafter swing the slide away from cutting position and which is operative, after a new blank has been chucked, to return the slide to cutting position and thereafter actuate the securing means to lock or clamp the slide in this position. In this machine, there is employed a spring actuated chuck for clamping the blank against movement during cutting. This chuck tends at all times to assume a clamping position. An added feature of this invention is the hydraulically controlled device for releasing the chucking mechanism. This is arranged to be actuated simultaneously with the mechanism for withdrawing the work slide, so that when the work slide has been moved far enough, the operator has simply to take the finished gear from the machine.

The hydraulically operated mechanism for controlling the work slide securing means and for moving the slide to and from operating position comprises, in the illustrated embodiment, a cylinder of any usual construction and a piston movable therein. The cylinder is pivotally connected by means of a lever arm with a nut for securing the work slide in cutting position and the piston is pivotally connected with the side.

Assuming the work slide to be in the cutting position, fluid pressure is admitted to one end of the piston. Since the slide is locked, the piston acts as a resistance. Hence, the cylinder is forced forward and the nut unscrewed. The piston now moves outwardly in the cylinder carrying with it the work slide and swinging the work angularly away from the tool mechanism. A second cylinder is secured to the outer end of the work spindle of the machine. This second cylinder houses a piston provided with a rod or stem which presses against the head of the draw rod or sleeve of the spring chuck. This second cylinder is connected on the same line with the piping for admitting fluid pressure to one end of the first described cylinder. As the slide moves outwardly, fluid pressure is admitted to one end of the second piston forcing the blank clamping device outwardly against the resistance of the spring to release the blank. The blank can be readily taken from the machine by the operator, then, when the slide has assumed its outer withdrawn position. To prevent return movement of the cylinder, a pawl is provided which is pivoted to the cylinder and which engages a notch in the locking lever when the slide is in outer position.

Assuming the blank slide to be in the outer position with a new blank positioned in the work spindle of the machine, fluid pressure will be admitted to the opposite side of the first piston and exhausted from the other side of that piston and from the cylinder secured to the work spindle. The spring chuck is thus allowed to grip the blank and simultaneously the first piston moves forward to bring the work slide back into cutting position. When the slide has reached the cutting position it strikes a positive stop. A screw on the slide simultaneously trips the pawl out of engagement with the locking lever. The piston again forms a resistant and the cylinder moves outward carrying the locking lever with it and tightening the nut to again secure the work head to the base.

Referring now to the drawings by numerals of reference, 10 indicates the frame of the machine, 11 the tool slide, 12 a column provided at one side of the machine, 13 the oscillatory cradle, 14 the tools, 15 the blank sleeve, 16 the indexing mechanism, 17 a bevel gear segment secured to the sleeve 15 and 18 a stationary gear segment secured to the frame of the machine. These parts are constructed and operate substantially in the manner described in the patent to James E. Gleason et al., No. 1,660,502, patented February 28, 1928, and reference may be had to that patent for a more detailed description thereof.

The blank to be cut is a bevel differential side gear 20 provided with an integral long shank or spindle 21. The shank or spindle of this gear 20 is so long that the gear blank or completed gear could not be chucked on or removed from the machine illustrated even though the tool slide 11 be moved away from the blank as far as is possible with the usual adjustments provided on the machine illustrated. I have found, however, that if the blank is swung angularly away from the tools, its axis can be so inclined to the tools that the completed blank can be taken from the machine at the left hand side of the machine looking at Fig. 1, and a new blank slipped into position.

Figure 2:
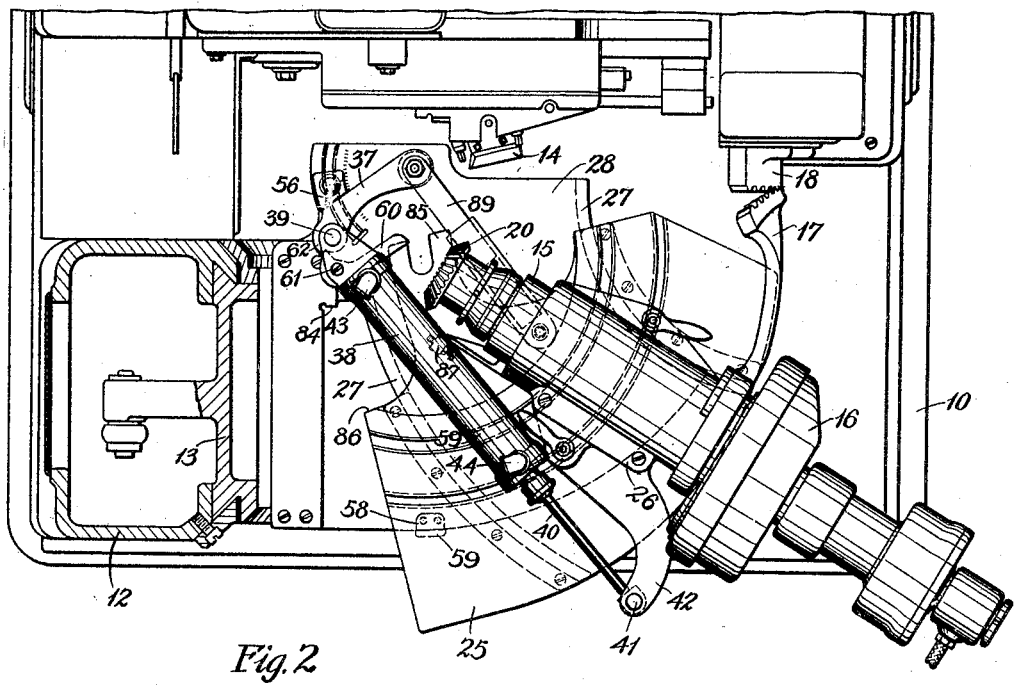
Figure 2 is a partial plan view showing the work slide or carrier swung away from operating position.

For this purpose, the plate 25 on which the work head 26 is angularly adjustable is made movable on arcuate ways 27 formed on the face of the base or plate 28 which is secured to the cradle 13. The ways or guides 27 are curved about an axis lying on the same side of the axis of the blank as the segments 17 and 18 and so placed that when the slide 25 moves on the ways 27 the teeth of the segments 17 and 18 will move into and out of engagement, as shown in Figures 1 and 2, without clash or interference.

Figure 4:
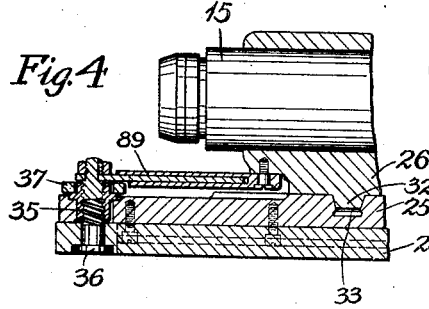
Figure 4 is a section on the line 4—4 of Figure 1.

The angular adjustment of the work head 26 on the plate 25 is usual in bevel gear cutting machines to permit adjusting the root surface of a tooth of the blank into the proper cutting plane. The work head can be secured in any adjusted position to the plate 25 by means of the bolts 30, the heads of which engage in the arcuate T-slot 31 formed in the face of the plate 25. A lug or projection 32 formed on the head 26 (Fig. 4) and engaging in a slot 33 formed concentrically of the T-slot 31 serves to guide the work head 26 in its angular adjustment. The sleeve 15 is rotatably journaled in the work head 26, as usual.

The slide 25 is adapted to be secured in forward position with the blank in cutting position by means of a nut 35 (Fig. 4) which engages a bolt or screw 36 mounted in the base or plate 28. Fastened to this nut 35 is a lever arm 37 which can be moved to lock or unlock the nut 35.

38 indicates a cylinder which is pivotally connected at 39 to the lever arm 37. 40 indicates a piston which is movable in the cylinder 38 and which is pivotally connected at 41 with an arm 42 formed integral with the work head 26.

Ducts or ports 43 and 44 are provided at either end of the cylinder 38 for the purpose of admitting fluid pressure to either end of the piston 40. The oil or other fluid used is pumped under pressure through the pipe 45 (Fig. 3) to a four-way connection 46 and it is exhausted or returned to the sump or reservoir through the pipe 47 which is connected to the connection 46. Piping 48 and 49 lead from this connection to the ducts or ports 43 and 44.

Adjustably journaled in the connection 46 is a rotatable valve 50. This valve can be moved by the operator, by turning hand lever 52, to control the direction of movements of the piston 40 and the cylinder 38.

Figure 3:
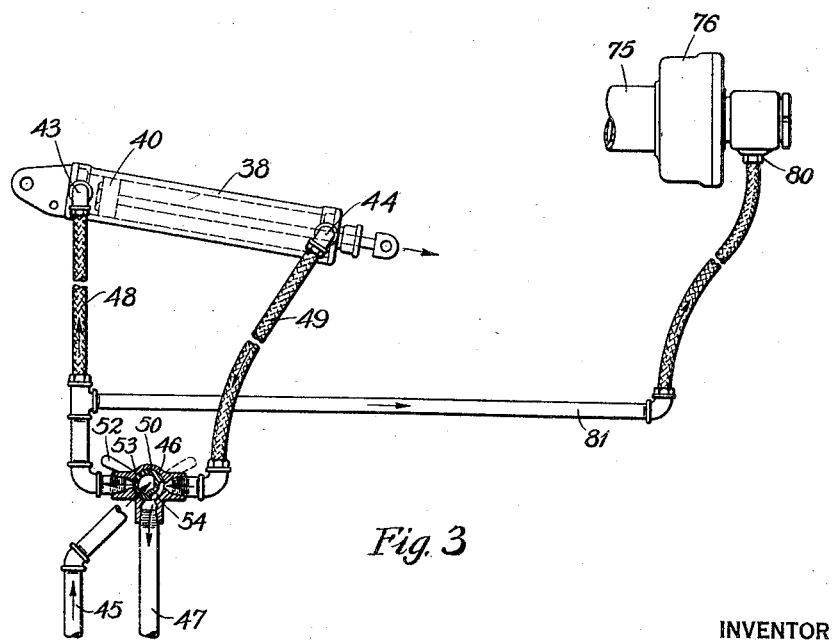
Figure 3 is a diagrammatic view showing the piping to the various fluid pressure controlled parts.

When the parts are in the position shown in Fig. 1 and the cutting operation upon the gear blank 20 has been completed, the operator turns the valve 50 by hand to the position shown in Figure 3. The fluid under pressure then passes from the pump through the pipe 45 to the interior of the valve 50 and out through the aperture 53 in the valve into the pipe 48. From the pipe 48 it passes into the port 43. Simultaneously the fluid is exhausted from the other end of the piston through the duct 44, piping 49, the valve slot 54 and the pipe 47, as shown. The fluid entering the port 43 forces the cylinder 38 forward, since the piston 40 forms a resistant. The forward movement of the cylinder rotates the lever arm 37 through an arc far enough to move the locking nut 35 to release the slide 25. At this instant, the lever arm 37 contacts with an adjustable stop or lug 56 (Fig. 1) adjustable in a circular slot formed in the plate or base 28. The cylinder is now held against movement and the piston 40 moves outwardly in the cylinder carrying with it the slide 25. When the lug 58 on the slide 25 contacts with the lug or stop 59 on the plate 28 the outward movement of the slide 25 stops and as the oil pressure continues, the cylinder 38 again moves forward. To limit this forward return movement, a pawl 60 is provided which is pivotally connected at 61 with the inner end of the cylinder 38. This pawl 60 is carried by the cylinder into engagement with the projection 62 formed on the outer end of the lever arm 37. Thus the cylinder 38 is held against forward or return movement and the parts are locked in the outer position shown in Fig. 2. The blank is then in a position where it can be readily removed from the machine.

Figure 5:
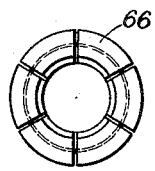
Figures 5 and 6 are an end view and a longitudinal section, respectively, of the expansible bushing employed for clamping the blank in chucked position.
Figure 6:
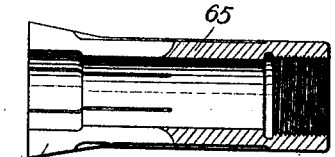

A chuck or clamp is always employed to hold the blank against movement during cutting. To avoid loss of time, I have provided means whereby this clamp or chuck may be automatically released during the time the slide 25 is being swung outwardly so that when the slide has reached its outer position all that the operator has to do is to slide the blank off the machine. The chuck or clamping means includes an expansible bushing 65 as shown in detail in Figures 5 and 6. This bushing is slitted lengthwise to provide a series of gripping fingers. These fingers 66 taper from their outer ends inwardly as shown in Figure 6. The bushing 65 is threaded to a hollow sleeve 68, as shown in Fig. 1. Secured to this sleeve at its inner end is a cap-plate 69. Interposed between this cap-plate 69 and the inner end of the spindle 70 of the machine is a coil spring 72. A spacing sleeve or arbor 73 is interposed between the inner end of the spindle 70 and the back face of the gear blank. The bore of this sleeve 73 is slightly tapered from its outer end inwardly to conform to the taper of the fingers 66 of the bushing 65. The coil spring 72 is powerful enough to force the sleeve 68 inwardly at all times. When the operator inserts the blank spindle 21 into the sleeve, then, the shaft 21 is gripped by the fingers 66 which are contracted about the shaft by the inward movement of the sleeve 68 under actuation of the coil spring 72. The blank is thus gripped securely against movement during cutting.

Secured to the outer end of the spindle 70 is a housing 75 to which is secured a cylinder 76. The piston 77 slides in this cylinder 76. This piston is provided with a stem or rod 78 which bears against the outer face of the cap-plate 69.

Fluid pressure may be admitted to and exhausted from the cylinder 76 through the duct or port 80, which is connected by the piping 81 with the piping 48, as shown in Fig. 3. Thus when the slide moves outwardly as above described, the oil under pressure passes from the pipe 48 into the pipe 81 and thence to the cylinder 76, forcing the piston 77 and its stem 78 forward compressing the spring 72 and moving the sleeve 68 to release the shank 21 of the gear. When the slide 25 has reached the position shown in Figure 3, then, the work gear will have been released and can be readily removed from the machine.

After a new blank has been positioned with its shank 21 within the sleeve 68, the operator will swing the handle 52 to the dotted line position shown in Fig. 3. Fluid pressure will now be exhausted from the inner end of the cylinder 38 and from the cylinder 76 and will be admitted to the outer end of the cylinder 38 through the piping 49. As the oil exhausts from the cylinder 76 the coil spring 72 will force the sleeve 68 and bushing 65 rearwardly gripping the shank 21 of the new gear blank to be cut. The oil passing into the cylinder 38 through the duct 44 acts first to move the piston 40 forward carrying the slide 25 into working position and reengaging the teeth of the segments 17 and 18. During this movement, the forked portion 85 of the slide 25 passes around the nut 35. When the slide has moved to working position, the shoulder 86 on the slide engages the stop 84 on the plate 28 and prevents further forward movement. Simultaneously, the set-screw 87 on the work head 26 engages and trips the pawl 60. The piston 40 now forms a resistant and the cylinder 38 moves backward rotating the lever 37 and nut 35 to lock the slide 25 to the base or plate 28.

The telescoping link member 89 which is pivoted on the bolt 36 and is pivotally connected to the work head 26 serves to guide the slide 25 in its movement to and from operating position. The bolt 36 in the machine illustrated is located at the apex of the blank to be cut and the link member 89, the lever arm 37 and the stop 56 are movable about this same apex point as a center. The mechanism illustrated, can be employed, then, where gears of different pitch cone angles are to be cut.

It is believed that the operation of the mechanism of this invention will be understood from what has gone before. While this invention has been described in connection with a preferred embodiment, it will be understood that the invention is capable of various modifications and uses within its limits and the scope of the appended claims and that this application is intended to cover any variations, uses, or adaptations of the invention following, in general, the principles of the invention and including such departures from the present disclosure as come within known or customary practise in the art and as may be applied to the essential features hereinbefore set forth and as fall within the scope of the appended claims.

Having thus described my invention, what I claim is:

1. In a machine of the class described, a base, a slide, movable means for securing said slide to said base and fluid pressure operated mechanism for releasing said slide securing means and thereafter moving said slide, comprising a cylinder and a piston movable in said cylinder, one of which is connected to said securing means and the other of which is connected to said slide and means for admitting fluid pressure to one end of said piston to effect a relative movement between said piston and cylinder to initially release said securing means and thereafter impart movement to said slide.

2. In a machine for producing gears, a blank support, a blank spindle journaled therein, a tool support, tool mechanism mounted thereon, a slide on which one of said supports is mounted, a base, means for securing said slide to said base with one of said members in operating position, fluid pressure operated means for releasing said securing means and moving said slide, comprising a cylinder and a piston movable in said cylinder, one of which is connected to said securing means and the other of which is connected to said slide and means for admitting fluid pressure to one end of said piston to effect relative movement between said piston and cylinder to initially release said securing means and thereafter withdraw said slide from operating position.

3. In a machine for producing gears, a blank support, a blank spindle journaled therein, a tool support, tool mechanism mounted thereon, a base, a slide on which one of said supports is mounted, movable means for securing said slide to said base, and fluid pressure operated mechanism for moving said slide and actuating said securing means into a locking position comprising a cylinder and a piston movable in said cylinder, one of which is connected to said securing means and the other of which is connected to said slide and means for admitting fluid pressure to one end of said piston to effect relative movement between the piston and the cylinder to initially move said slide to bring the support carried thereby from a withdrawn into an operating position and to thereafter actuate said securing means to secure said slide to said base in said operating position.

4. In a machine for producing gears, a blank support, a blank spindle journaled therein, a tool support, tool mechanism mounted thereon, a base, a slide on which one of said supports is mounted, movable means for securing said slide to said base in operating position, and fluid pressure operated mechanism for controlling said securing means and moving said slide to and from operating position comprising a cylinder and a piston movable in said cylinder, one of which is connected to said securing means and the other of which is connected to said slide, means for admitting fluid pressure to one end of said piston to effect a relative movement between the piston and cylinder to initially release said securing means and thereafter withdraw said slide from operating position and means for admitting fluid pressure to the other end of said piston to initially return said slide to operating position and thereafter actuate said securing means to lock said slide to said base in said position.

5. In a machine for producing gears, a blank support, a blank spindle journaled therein, a tool support, tool mechanism mounted thereon, a slide on which one of said supports is mounted, a base, movable means for securing said slide to said base with the support carried thereby in operating position, a blank spindle journaled in said blank support, means for clamping the blank to said spindle, fluid pressure operated mechanism for releasing said clamping means and fluid pressure operated mechanism for initially moving said slide securing means to release said slide and thereafter withdraw said slide from operating position to permit removal of said blank from said spindle.

6. In a machine for producing gears, a blank support, a blank spindle journaled therein, a tool support, tool mechanism mounted thereon, a slide on which one of said supports is mounted, a base, movable means for securing said slide to said base with the support carried thereby in operating position, means for clamping the blank to the blank spindle, fluid pressure operated mechanism for releasing said clamping means and fluid pressure operated mechanism for initially moving said slide securing means to release said slide and to thereafter withdraw said slide from operating position to permit removal of said blank from said spindle, and means operable to permit simultaneous actuation of both fluid pressure operated mechanisms.

7. In a machine for producing gears, a blank support, a blank spindle journaled therein, a tool support, tool mechanism mounted thereon, a slide on which one of said supports is mounted, a base, movable means for securing said slide to said base with the support carried thereby in operating position, means for clamping the blank to the blank spindle, a coil spring for maintaining said clamping means in clamping position, fluid pressure operated mechanism for moving said clamping means against the resistance of said spring to release the blank, and fluid pressure operated mechanism for initially moving said slide securing means to release said slide and thereafter withdrawing said slide from operating position, and means operable to permit simultaneous actuation of both fluid pressure operated mechanisms.

8. In a machine for producing gears, a blank support, a blank spindle journaled therein, tool support, a tool mechanism mounted thereon, a slide on which one of said supports is mounted, a base, movable means for fixedly securing said slide to said base with the support carried thereby in operating position, means for clamping the blank to the blank spindle, a spring for maintaining said clamping means in clamping position, a cylinder carried by the blank support, a piston movable in said cylinder, means for admitting fluid pressure to one end of said piston to move the clamping means against the resistance of said spring to release the blank, fluid pressure operated mechanism for initially releasing said securing means and thereafter withdrawing said slide from operating position to permit removal of said blank from said spindle comprising a cylinder and a piston movable in said cylinder, one of which is connected to said slide and the other of which is connected to said securing means and means for admitting fluid pressure to one end of said piston to effect relative movement between the piston and cylinder to initially move said securing means to release the slide and thereafter withdraw said slide from operating position, and means operable to permit simultaneous actuation of both fluid pressure actuated mechanisms.

9. In a machine for producing gears, a blank support, a blank spindle journaled therein, a tool support, tool mechanism mounted thereon, a slide on which one of said supports is mounted, a base, movable means for securing said slide to said base with the support carried thereby in operating position, means for clamping the blank to the blank spindle, means normally urging said clamping means into clamping position, fluid pressure operated mechanism operative to release said clamping means, fluid pressure operated mechanism for controlling said slide securing means and moving said slide to and from operating position, said last named mechanism being operative, when the slide is in operating position, to first release said securing means and thereafter withdraw said slide from operating position to permit removal of the blank from the blank spindle, and being operative when said slide is withdrawn to first return said slide to operating position and then actuate the said securing means to lock said slide to said base, and a single control device for simultaneously controlling both said fluid pressure operated mechanisms.

10. In a machine for producing gears, a blank support, a blank spindle journaled therein, a tool support, tool mechanism mounted thereon, a slide on which one of said supports is mounted, a base, movable means for securing said slide to said base with the support carried thereby in operating position, means for clamping the blank to the blank spindle, means normally urging said clamping means into clamping position, fluid pressure operated mechanism for releasing said clamping means, fluid pressure operated mechanism for controlling said slide securing means and moving said slide to and from operating position comprising a cylinder and a piston movable in said cylinder, one of which is connected to said securing means and the other of which is connected to said slide, means for selectively admitting fluid pressure to either end of said piston and means for simultaneously controlling both said fluid pressure operated mechanisms.

11. In a machine for producing gears, a blank support, a blank spindle journaled therein, a tool support, tool mechanism mounted thereon, means for adjusting the blank support angularly to bring the blank into engagement with the tool mechanism for cutting, and means for moving the blank support angularly about a point lying on the same side of the blank axis as that portion of the blank which is in engagement with the tool mechanism, to permit moving the blank support clear of the tool mechanism for chucking and unchucking of the blank.

12. In a machine for producing gears, a blank support, a blank spindle journaled therein, a tool support, tool mechanism mounted thereon, a cradle on which one of said supports is mounted, a bevel gear segment connected to the blank spindle, a second segment having a fixed relation to the tool mechanism, means for adjusting the blank support angularly about an axis perpendicular to the axis of the cradle to bring the blank into proper cutting relation with said segments in mesh, means for oscillating the cradle on its axis and for intermittently indexing the blank, and means for moving said blank support angularly about an axis lying on the same side of the blank axis as said gear segment and so placed as to permit the teeth of the segment to rock clear of each other on imparting said last named movement to the blank support to permit chucking or unchucking of the blank.

13. In a machine for producing gears, a blank support, a blank spindle journaled therein, a tool support, tool mechanism mounted thereon, a cradle on which one of said supports is mounted, a bevel gear segment connected to the blank spindle, a second segment having a fixed relation to the tool mechanism, means for adjusting the blank support angularly about an axis perpendicular to the axis of the cradle to bring the blank into proper cutting position with said segments in mesh, means for oscillating the cradle on its axis and for intermittently indexing the blank, a slide carried by the cradle, on which the blank support is mounted, said slide being movable about an axis lying on the same side of the blank axis as said segment and so placed as to permit the segments to rock clear of each other on movement of said slide, means for securing the slide with the blank in operating position and fluid pressure operated mechanism operable to initially release said securing means and thereafter move said slide to withdraw the blank from operating position.

14. In a machine for producing gears, a blank support, a blank spindle journaled therein, a tool support, tool mechanism mounted thereon, a cradle on which one of said supports is mounted, a bevel gear segment connected to the blank spindle, a second segment having a fixed relation to the tool mechanism, means for adjusting the blank support about an axis perpendicular to the axis of the cradle to bring the blank into proper cutting position with said segments in mesh, means for oscillating the cradle on its axis and for intermittently indexing the blank, a slide on which the blank support is mounted, said slide being movable about an axis lying on the same side of the blank axis as said segments and so placed as to permit the teeth of the two segments to move freely into and out of engagement on movement of said slide, means for securing the slide with the support carried thereby in operating position and fluid pressure operated mechanism for controlling said securing means and moving said slide to and from operating position, said last named mechanism being operative, when the slide is in operating position to initially release said securing means and thereafter withdraw said slide, and when said slide is in the withdrawn position, to initially return said slide to operating position and thereafter actuate said securing means to clamp the slide to the base.

15. In a machine for producing gears, a blank support, a blank spindle journaled therein, a tool support, tool mechanism mounted thereon, a cradle on which one of said supports is mounted, a bevel gear segment connected to the blank spindle, a second segment having a fixed relation to the tool mechanism, means for adjusting the blank support about an axis perpendicular to the axis of the cradle to bring the blank into proper cutting position with said segments in mesh, means for oscillating the cradle on its axis and for intermittently indexing the blank, a slide on which the blank support is mounted, said slide being movable about an axis lying on the same side of the blank axis as said segments and so placed as to permit the teeth of the two segments to move into and out of engagement on movement of said slide, means for clamping the blank to the blank spindle, fluid pressure operated mechanism for releasing said clamping means, means for securing the slide in operating position and fluid pressure operated mechanism for controlling said securing means and moving said slide to and from operating position, said last named mechanism being operative when the slide is in cutting position, to initially release said securing means and thereafter withdraw said slide from cutting position and, when said slide is withdrawn, to initially return said slide to cutting position and thereafter actuate said securing means to clamp the slide to the base, and a single control device for simultaneously controlling both said fluid pressure operated mechanism.

16. In a machine for producing gears, a blank support, a tool support, tool mechanism mounted on the tool support, a blank spindle journaled in the blank support, a cradle on which one of said supports is mounted, a bevel gear segment connected to the blank support, a second segment having a fixed relation to the tool mechanism, means for adjusting the blank support angularly about an axis perpendicular to the axis of the cradle to bring the blank into proper cutting position with said segments in mesh, means for oscillating the cradle on its axis and for intermittently indexing the blank, a slide on which the blank support is mounted, said slide being movable about an axis lying on the same side of the blank axis as said segments and so placed as to permit the teeth of the two segments to move into and out of engagement on movement of said slide, a bolt and nut for securing said slide with the blank in operating position, a lever secured to one of said members, a cylinder pivoted to the lever, a piston movable in said cylinder and pivotally connected to said slide, means for admitting fluid pressure to either end of said piston to actuate the securing means to and from locking position and to move the slide to and from operating position, means for positively limiting the movement of the slide in either direction, a pawl carried by the cylinder adapted to engage a notch in said lever to prevent the cylinder from moving said securing means when the slide has been withdrawn and means carried by said slide adapted to trip said pawl during the return movement of said slide to release said cylinder and permit said cylinder to actuate said securing means into locking position.

HERBERT J. WHITE.